Figure 1:
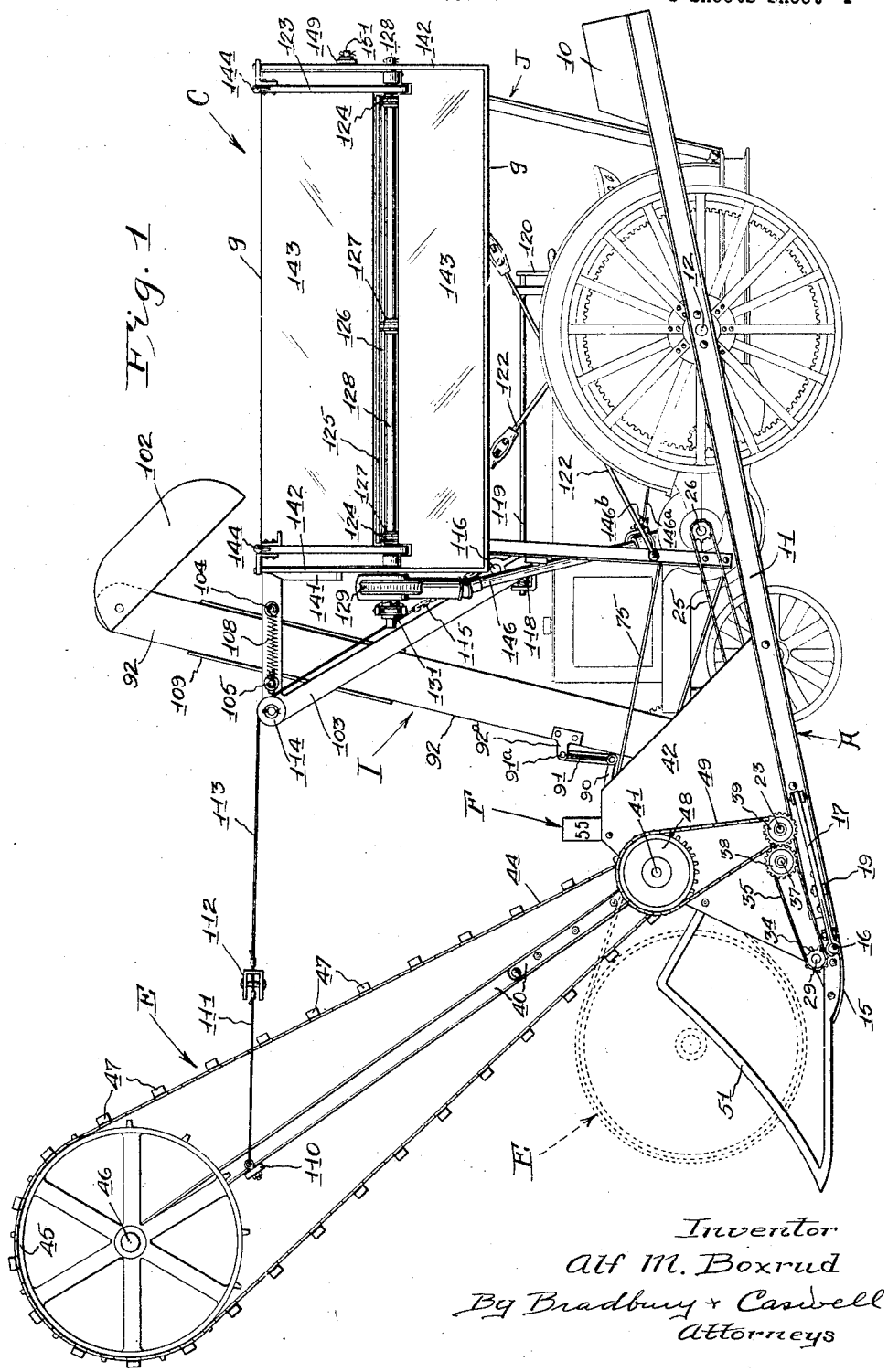

May 31, 1927.

A. M. BOXRUD 1,630,603

ENSILAGE HARVESTER

Filed Dec. 21, 1920

6 Sheets-Sheet 1

Inventor
Alf M. Boxrud
By Bradbury + Caswell
Attorneys

May 31, 1927.

A. M. BOXRUD 1,630,603

ENSILAGE HARVESTER

Filed Dec. 21, 1920 6 Sheets-Sheet 2

Fig. 2

Inventor
Alf M. Boxrud
By Bradbury &
Criswell
Attorneys

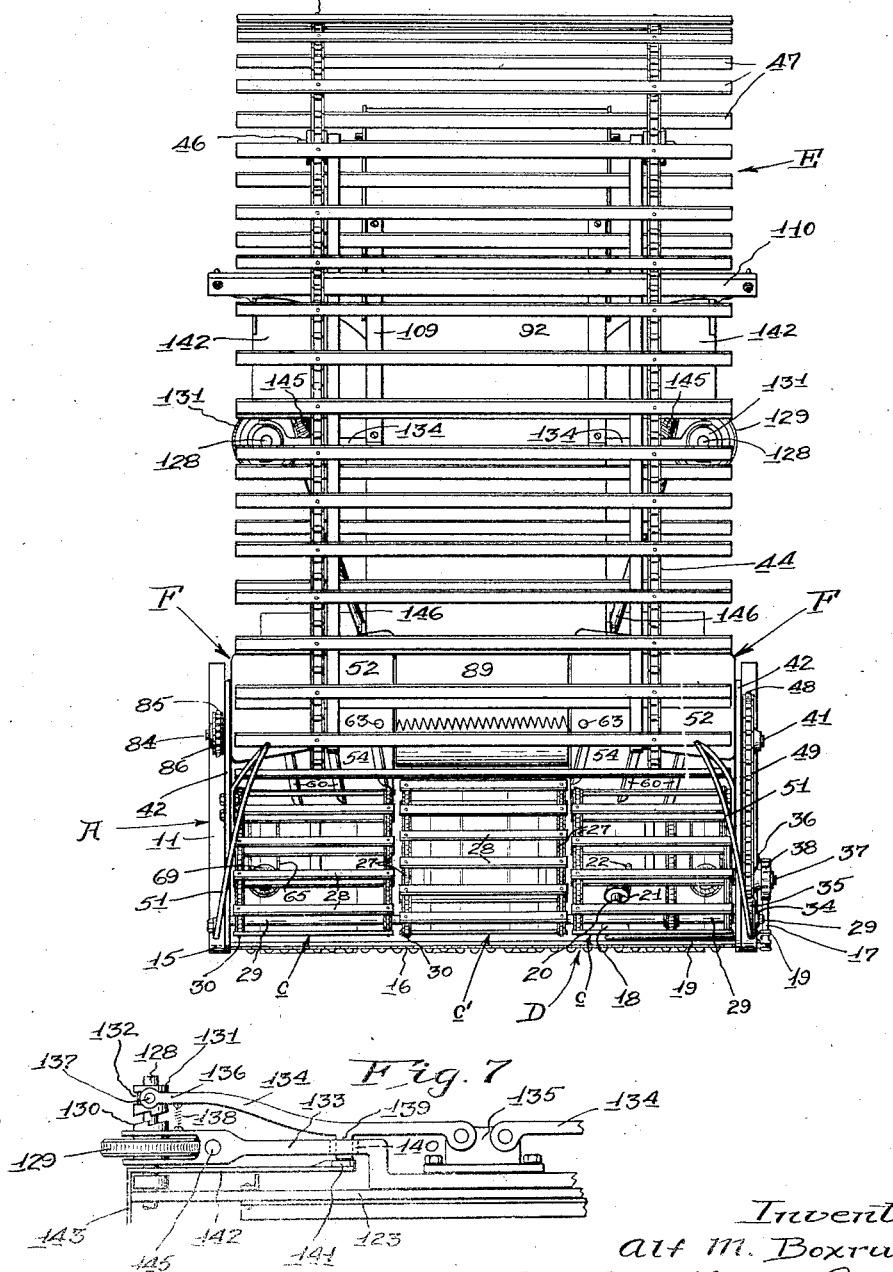

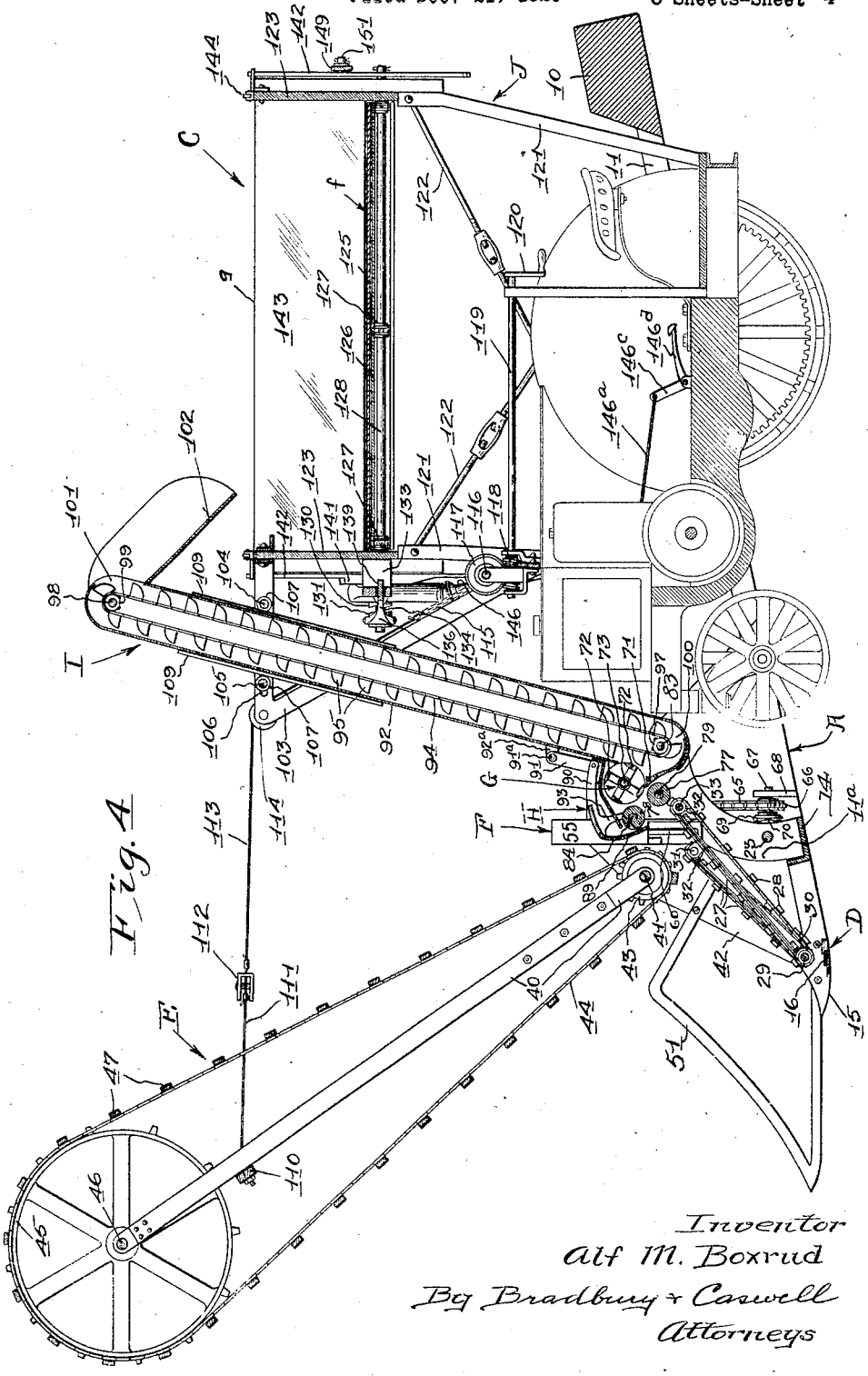

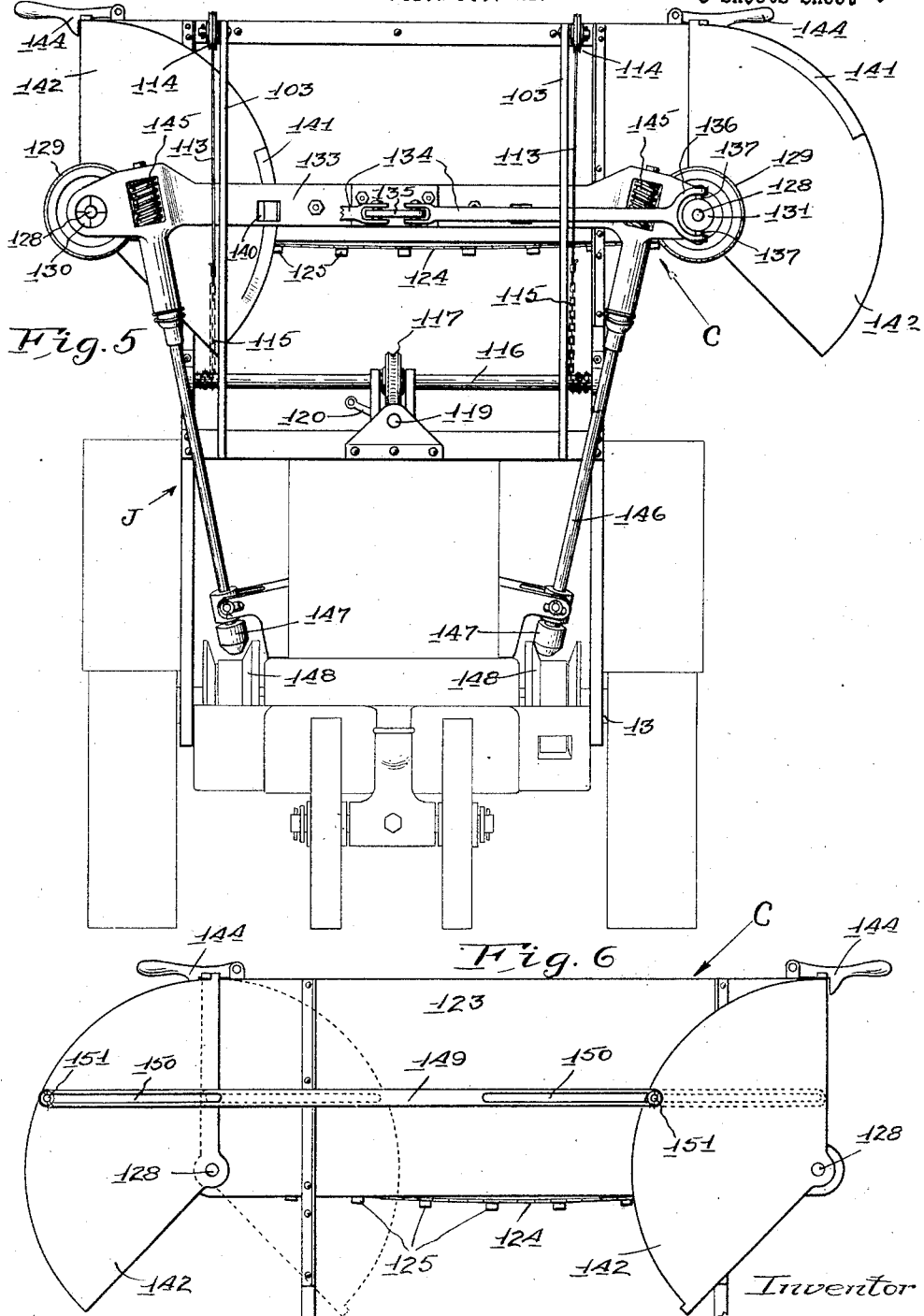

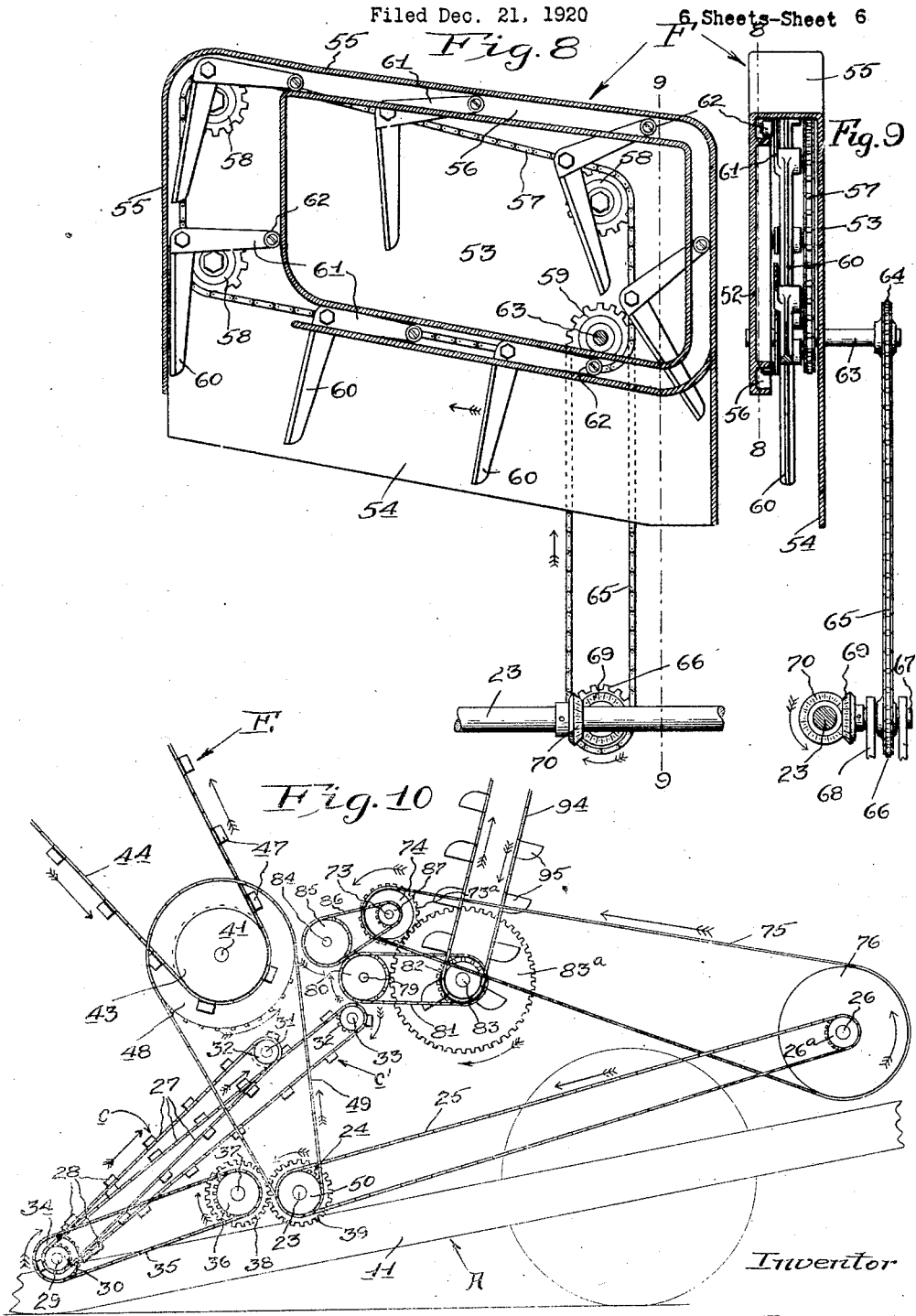

Patented May 31, 1927.

1,630,603

UNITED STATES PATENT OFFICE.

ALF M. BOXRUD, OF MINNEAPOLIS, MINNESOTA.

ENSILAGE HARVESTER.

Application filed December 21, 1920. Serial No. 432,224.

My invention relates to improvements in ensilage harvesters.

Its object is to provide an attachment of this kind for farm tractors, particularly though not exclusively, for the type illustrated in the accompanying drawings, said attachment being equipped with a cutter, a chopper and feeding mechanism for the latter, the cutter being arranged to sever, at the butts, ensilage material such as corn, sunflowers, alfalfa, clover, sweet clover, cow peas and like vegetation, the feeding mechanism being adapted to pass the vegetation, top ends foremost, into the chopper and, prior to the severance of the stocks, to obtain a grip upon the vegetation, the top ends of relatively tall stocks being directed into the chopper before their butt ends are severed.

A further object is to provide a device of this kind having a wide cutter element and a relatively narrow chopping device, together with means for directing the vegetation into the cutter, top ends foremost.

Another object is to supply a tiltable structure designed for attachment to a tractor, said structure carrying severing mechanism, chopping means and an elevator for the chopped product; also a superstructure carrying a self-dumping receptacle to receive the product from said elevator.

With the foregoing and other objects in view, which will appear in the following description, the invention resides in the novel combination and arrangement of parts and in the details of construction hereinafter described and claimed.

In the drawings, Fig. 1 is a side elevation of a preferred form of my improved ensilage harvester attachment, illustrated as applied to a tractor; Fig. 2 is a plan view thereof; Fig. 3 is a front elevation of the same; Fig. 4 is a longitudinal sectional view taken on the line 4—4 of Fig. 2; Fig. 5 is a detail elevation of a tractor with my superstructure and ensilage receptacle in place thereon, the tiltable frame and mechanism supported thereby being omitted; Fig. 6 is a rear elevation in detail of the ensilage receptacle; Fig. 7 is a plan view in detail illustrating a portion of the driving mechanism for the endless, movable bottom of said receptacle, also mechanism for throwing the same into and out of gear; Fig. 8 is a longitudinal sectional view in detail of one of the cross feeding devices employed to direct vegetation into the chopping mechanism, said figure being taken on the line 8—8 of Fig. 9; Fig. 9 is a detail sectional view taken on the line 9—9 of Fig. 8, and Fig. 10 is a diagrammatic view illustrating the relative positions of various parts of my device, together with the driving mechanism therefor.

My improved attachment includes a main frame A adapted to be tiltably mounted upon a tractor with the forward end thereof extending forwardly of the tractor. A weight 10 on said frame, at the rear of its pivotal support, substantially counterbalances the weight of cutter, chopping and feeding mechanism and an elevator leading from the chopping mechanism, all located on said frame in front of the tractor. My attachment also includes a superstructure J for the tractor and a receptacle C carried thereon in position to receive ensilage from said elevator.

The tiltable frame A includes two side beams 11, which, in the present instance, are tiltable on pintles 12, projecting from the ends of the dead axle 13 of the tractor. The counterbalancing weight 10 is carried upon the ends of said beams at the rear of the tractor and a cross brace 14 is employed to join the forward ends of said beams. Said cross brace 14 has forwardly projecting members terminating in upwardly turned tips, which provide shoes 15 for slidably supporting the forward ends of the beams 11 upon the ground. Upright supporting plates 42, carried by the beams 11, and upright brackets 11$^a$ seated on the cross piece 14, supply supports for various parts of my structure, including the gatherer, chopper and elevator.

A cutter D (Fig. 4) of usual form, traverses the space between the shoes 15, the sickle bar 16 therein being connected at one end with a rocker-arm 17 extending rearwardly of the frame A and pivoted at its rearward extremity on one of the beams 11. A crank 18 (lower part Fig. 3), connected through a pitman rod 19 with said rocker-arm, is mounted on a shaft 20 driven through bevel gears 21 and 22 from a second shaft 23, said second shaft being supplied with a sprocket wheel 24 connected through a chain 25 with a sprocket 26$^a$ (Fig. 10) on the power shaft 26 of the tractor. The connection between said shaft 23 and tractor is such that the ordinary vertical oscillation of the tiltable frame A will not materially affect the tension of said chain.

Three upwardly and rearwardly inclined conveyors $c$ and $c'$ (Fig. 3), comprising part of the feeding mechanism, have their lower ends in close proximity to and slightly above the cutter D. These conveyors are of the endless type, each comprising a pair of chains 27 or aprons carrying transverse slats or cleats 28. A shaft 29, journaled in the side members of the frame A just above the cutter D, carries sprocket wheels 30 for the chains 27 of said conveyors. Two aligned idler shafts 31, journaled in said frame above and at the rear of said shaft 29, carry sprocket wheels 32 for the chains 27 of the outer conveyors $c$. A third idler shaft 33, journaled in said frame A at the rear of and parallel with said idler shafts 31, carry sprocket wheels 32 for the chains 27 of the central conveyor $c'$. These idler shafts 31 are arranged, as described, so that the upper run of the central conveyor $c'$ will occupy a plane beneath that of the upper runs of the outer conveyor $c$ and thereby form a step-down from the outer conveyors to the central conveyor. The shaft 29 is turned in a direction to drive the upper runs of said conveyors $c$ and $c'$ rearwardly, said shaft having a driving sprocket 34 thereon propelled through a chain 35 driven from a sprocket wheel 36 journaled on a stub shaft 37 secured to the frame A. This sprocket wheel 36 is integral with a spur gear 38 meshing with a spur gear 39 on the shaft 23, above described. Another element of the feeder is furnished in an extensible and collapsible gatherer E, which is provided to direct the top ends of vegetation into the gripping throat formed between said gatherer and the conveyors $c$ and $c'$. Said gatherer E comprises a pair of sectional reaches 40, the lower ends thereof being pivoted on a shaft 41 journaled transversely in supporting plates 42 on the side beams 11. This shaft is fitted with a pair of fixed spaced sprocket wheels 43, carrying the rearward turns of an endless chain 44 and driving the same. The forward turns of said chains pass over idler sprockets 45 journaled on a transverse shaft 46 mounted in the outer ends of the reaches 40. Spaced transverse slats 47 are secured near their ends to the chains 44, the links of which are capable of being disconnected so that the apron, composed of said chains and slats, may be conveniently lengthened or shortened by the addition or removal of parts. The drive shaft 41 of the gatherer E carries a large sprocket wheel 48 at one end thereof. A chain 49, passing over said sprocket wheel 48 and over a sprocket wheel 50 on the shaft 23, transmits motion from the latter shaft to the former.

The tops of vegetation, rooted within the path of the cutter D and leaning to the sides thereof, are lifted into the path of the lower run of the gatherer E by means of forwardly extending guides 51 secured to the supporting plates 42 and turned inward at their upper ends.

Cross feeding devices F, located at the upper ends of the outer conveyors $c$, direct the incoming vegetation from said outer conveyors to the central conveyor $c'$. The chopper G (Fig. 4), at the head of the central conveyor $c'$, receives the vegetation and reduces it to a form suitable for ensilage purposes. Said cross feeding devices are substantially identical, each including a housing having a forward wall 52 (Figs. 8 and 9), a rear wall 53 extending considerably beneath the lower edge of the forward wall to form a stop-plate 54 and a web 55 joining said walls at top and ends thereof. The forward wall 52 (Fig. 8) is formed with an inner way 56. An endless chain 57, carried on idler sprockets 58, and a driving sprocket 59, between the walls 52 and 53 of the housing, pivotally support a plurality of depending arms 60. Reaches 61, on said arms, are supplied at their outer ends with rollers 62 designed to travel in the way 56. The runs of the way 56 and chain 57 are so directed that in the working sweep the arms 60 will be slightly tilted from the perpendicular and travel toward the head of the center conveyor $c'$ in a path inclined slightly from the horizontal, as shown in Fig. 8. The relation of the runs of said chain 57 and ways 56 result in lifting the arms 60 vertically at the inner extremity of their working strokes, thus freeing the arms from the vegetation and clearing the same from the path of that following. Upon approaching initial position in their working stroke at the outer ends of the cross feed devices, the lower ends of said arms 60 are tilted outward so as to gather in the vegetation at the outer margins of the outer conveyors $c$. The driving sprocket 59 in each of my cross feeding devices is fixed on a shaft 63 journaled in the walls 52 and 53 of the housing. A second sprocket 64 on said shaft carries a chain 65 reaching downward to a sprocket wheel 66 on a stub shaft 67 journaled in the brackets 68 on the frame A. A bevel gear 69 fixed on said stub shaft 67 meshes with a companion gear 70 on the shaft 23.

Slightly above and at the rear of the head of the central conveyor $c'$, I arrange my chopper G, which includes a transverse stationary shearing blade 71 and a plurality of spirally arranged revoluble blades 72 carried by spokes or webs on a shaft 73 journaled in the brackets $11^a$ and in one of the plates 42 of the frame A. This shaft is supplied with a pulley 74 receiving the forward turn of a belt 75 passing over a second pulley 76 on the power shaft 26 of the tractor. Interposed between the chopper G and the upper turn of the central conveyor c′ are a pair of feeding rollers 77 and 78 for the chopper. The lower roller 77 is carried on a shaft 79 journaled at its ends in the brackets 11ᵃ. A sprocket wheel 80 on said shaft 79 is connected through a chain 81 with a sprocket wheel 82 on a shaft 83, hereinafter referred to. The upper roller 78 is carried on a shaft 84, journaled at the extremities of said roller in the brackets 11ᵃ, one end of said shaft being extended through one of the plates 42 and also journaled therein. A sprocket wheel 85 on said shaft 84 is connected through a chain 86 with a sprocket wheel 87 on the chopper shaft 73. Cranks 88 are formed on the roller shaft 84 for operating a transverse feeding claw H. This claw comprises a yoke, the reach between its arms including a depending plate 89 serrated at its lower edge. The arms 90 of said yoke rest approximately horizontally, the ends thereof being pivotally connected with the lower ends of upright links 91 joined at their upper ends to a rocker-shaft 91ᵃ on the elevator housing 92, said rocker-shaft being journaled in lugs 92ᵃ on said housing. Arms 93, depending from the arms 90 of the yoke, join the same with the cranks 88 on said roller shaft 84. Rotation of this shaft imparts a clawing motion to the serrated edge of the plate 89, said edge being lowered in front of the gap between the rollers 77 and 78 and, at the same time, pulled rearwardly toward said gap, then returned to its elevated position, thus completing its cycle of movement.

The elevator I includes spaced endless chains 94 with buckets 95 thereon and the elevator housing 92. The shaft 83, above mentioned, is suitably journaled in the brackets 11ᵃ and pivotally supports the elevator housing 92 at its lower end and carries spaced sprocket wheels 97, beneath which the lower turns of the chains 94 pass. A shaft 98, journaled at its ends in the sides of the elevator housing 92, carries sprockets 99, over which the upper turns of said chains 94 travel. A spur gear 73ᵃ, on the chopper shaft 73, meshes with a larger spur gear 83ᵃ on the shaft 83, said gears serving to transmit motion from the former shaft to the latter. A pocket 100 in the lower end of the housing 92, receives ensilage from the chopper G and the buckets 95 pick the ensilage from said pocket, carry it to the top of the elevator and discharge it through an opening 101 in the housing 92 into a trough 102, emptying into the ensilage receptacle C. The frame A, being free to oscillate in compensating for irregularities in the ground surface, causes the elevator to rise and fall through short distances. I provide a yielding slidable support for the upper end of the elevator to permit such motion and to allow for its slight changes in inclination, when so moved. Brackets 103, reaching forwardly from the superstructure J and passing upon either side of the elevator housing, support two transverse rods 104 and 105, the former being fixed at its ends in the brackets 103 and the latter slidably mounted at the ends thereof in horizontal slots 106 in said brackets. The housing 92 passes between these rods 104 and 105 and rollers 107 thereon revolubly bear against the forward and rear sides of said housing. The rod 105 may be shifted forwardly under pressure against the action of springs 108, which join said rod with the stationary rod 104, said springs being adapted to retract said rod 105 and hold the rollers 107 thereon against slides 109 on the face of the housing 92.

The gatherer E, above described, is adjusted and secured in various angular positions by the following mechanism: A crosspiece 110, secured beneath the reaches 40, is supplied at its ends with leaders 111 reaching rearward to a spreader bar 112. Cables 113, passing rearward from the spreader bar 112, extend over guide pulleys 114 on the forward tips of the brackets 103, thence downwardly and rearwardly to chains 115, to which said cables are joined. The chains are wrapped on a transverse shaft 116 journaled at its ends on the superstructure J. A worm wheel 117 on said shaft 116 meshes with a worm 118 on a longitudinally disposed shaft 119 also journaled on the superstructure. A crank 120 on this shaft 119 serves to turn the same in either direction, thus winding or unwinding the chains 115 from the shaft 116. In the winding in of said chains, the gatherer E is lifted and in the paying out of said chains, the gatherer is lowered. It will thus be seen that by turning the crank 120, the gatherer may be set at any desired angle, the same being fixed against accidental displacement owing to the locking action of the worm wheel 117 and worm 118. The advanced positions of the guide pulleys 114 free from obstructions the reaches of the cables 113 between said pulleys and spreader bar 112, when the gatherer E is shortened and lowered for handling exceptionally short vegetation, as shown in dotted lines Fig. 1.

The ensilage receptacle C is carried upon the superstructure J, which comprises uprights 121 carried by the tractor and cross braced by diagonal stay rods 122. Said receptacle has forward and rear ends 123, gates g forming sides and a self dumping floor f. Said floor comprises, generally, an endless apron carried at its turns on revoluble supports. I prefer to employ an apron consisting of spaced endless chains 124 carrying slats 125, a stationary plate 126 being placed directly beneath the upper run of the chains 124. Said chains turn on sprocket wheels 127, carried by shafts 128, journaled in the ends 123 of the receptacle. On the forward end of each of said shafts 128 is a loosely mounted worm wheel 129 (Fig. 7), the outer face of its hub being ratcheted to form the fixed member 130 of a jaw clutch. Feathered on each shaft 128 is a sliding clutch member 131, comprising a collar with ratchets on the face adjacent to its companion clutch member 130, said collar being formed with an annular groove 132 in its periphery. Brackets 133 on the forward end of the receptacle are bifurcated at their ends to embrace opposite sides of the worm wheels 129 and secure them against endwise movement on the shafts 128. Levers 134 pivoted at their inner ends on a flange 135, at the forward end of the receptacle C, carry yokes 136 at their outer ends. Pins 137 in said yokes, reach inwardly into the grooves 132 in the sliding clutch members 131. Springs 138, stretched between the ends of the levers 134 and brackets 133, tend to swing the former and thereby throw the sliding clutch members 131 into engagement with the fixed clutch members 130. Lugs 139, midway between the ends of the levers 134, extend through openings 140 in the brackets and abut against cam slides 141 on the forward guard segments 142 of the gates $g$. At this point it will be noted that each gate comprises a closure plate 143 with the inwardly projecting segment plates 142 thereon. These plates are journaled on the shafts 128, thereby forming tiltable supports for said gates. When the gates are swung downward, they provide chutes for ensilage material, the closure plates 143 forming the bottoms of the chutes and the segment plates 142 forming guards at the ends thereof. The cam slides 141, above mentioned, are located in the margins of the forward segment plates and are arranged to bear against the lugs 139 on the levers 134 when the gates $g$ are closed, thus holding the clutch members 131 out of engagement with the clutch members 130. When the gates $g$ are lowered, these cam slides 141 are withdrawn from the lugs 139, thus permitting the springs 138 to swing the levers 134 and engage the sliding clutch members 131 with the clutch members 130. Latches 144 on the ends 123 of the receptacle C, catch the upper margins of the plates 143 and secure them in closed positions. The worm wheels 129, being rotated as will later appear, cause their individual shafts 128 to turn upon the engagement of the clutch members 131 and 130 and results in discharging the contents of the receptacle over the gate that is lowered. Worms 145, in mesh with the worm wheels 129, may be propelled through suitable means from the tractor mechanism. I have chosen individual friction drives for said worms 145, each worm being supplied with a depending, jointed shaft 146, slidably supported by the tractor frame and furnished with a driven friction member 147 for engagement with a companion friction member 148 in the tractor mechanism. Each jointed shaft 146 is swung to engage its respective driven friction member with its corresponding driving friction member of the tractor by a cable $146^a$ reaching inward from the shaft 146 around a pulley $146^b$ and rearward to an arm $146^c$ on a pedal $146^d$. I avoid the danger of simultaneously engaging the clutch members 130 and 131 on the two shafts 128 by tying the gates $g$ together, thus permitting the lowering of but one gate at a time. A tie link 149, having slots 150 at its ends, extends between the rear segmental plates 142 of the two gates $g$. Studs 151 on said plates, rest in said slots 150. The link 149 and slots 150 are of such length that one gate can be fully lowered only when the opposite gate is closed.

The gatherer E, conveyors $c$ and $c'$, claw H and rollers 77 and 78 are operated at such speeds with respect to the speed of travel of the tractor that clogging of the harvester is avoided. The lower run of the gathering apron is moved rearwardly at a speed considerably greater than that of the movement of the tractor, thus causing the top ends of vegetation to be grasped and secured against other than predetermined feeding movement by the feeding mechanism preparatory to its severance by the cutter D. The arms 60 of the cross feeding devices F are moved considerably faster than the surface speed of the conveyors $c$ and $c'$ to prevent the crowding of vegetation against the stop plates 54. The gatherer E may be raised or lowered in travel by manipulation of the crank 120. The contents of the receptacle C may be discharged into a wagon at either side of the harvester, at rest or in travel, by releasing the appropriate latches 144, thus permitting a gate $g$ to fall and thereby causing the movable floor $f$ to be propelled in the direction of said lowered gate.

Changes in the specific form of my invention, as herein disclosed, may be made within the scope of what is claimed without departing from the spirit of my invention.

Having described my invention, what I claim as new and desire to secure by Letters Patent is:

1. In a device of the class described, a cutter for ensilage material, a central and adjacent outer conveyors passing rearwardly from said cutter, the latter occupying higher positions than that of the central conveyor, an ensilage chopper at the delivery end of the central conveyor and cross feed mechanism at the rear extremities of the outer conveyors to direct ensilage material therefrom to said central conveyor.

2. In a device of the class described, an ensilage chopper, a cutter for severing rooted stalks and a throat-like feeder comprising upper and lower traveling members for gripping stalks in the grip of said members, between them and directing said stalks, tops first, into said chopper, said upper traveling member extending forwardly of said lower member and adjustable vertically to suit vegetation of various heights.

3. In a device of the class described, the combination with a tractor of a floating frame mounted upon the tractor, a cutter, a chopper, a conveyor passing from the former to the latter and an elevator leading from the chopper, all carried by said frame, a receptacle on the tractor frame for receiving ensilage from the elevator, an endless movable floor in said receptacle and driving means for operating the cutter, chopper, conveyor, elevator and movable floor, said means being propelled from the tractor mechanism.

4. In a device of the class described, the combination with a tractor, of a floating frame on the tractor and extending forwardly thereof, a receptacle for ensilage carried upon the tractor, a chopper, means for feeding ensilage material thereto, tops first, a cutter to sever the stalks of said material at the butts thereof, a tiltable elevator to carry ensilage from the chopper to said receptacle, said chopper, cutter and elevator being carried by said tiltable frame, and means on the tractor for slidably supporting the upper end of the elevator.

5. In a device of the class described, the combination with a tractor, of a support on the tractor carrying a chopper for ensilage material, a stalk severing cutter, an elevator for ensilage leading from said chopper and an ensilage receiving receptacle, said receptacle having gates at its sides and an endless reversible bottom, driving means propelled by the tractor mechanism and operatively connected with said bottom for moving the same and mechanism controlled by the lowering of said gates to render said driving mechanism operative.

6. In a device of the class described, the combination with a tractor, of a support on the tractor carrying a chopper for ensilage material, a stalk severing cutter, an elevator for ensilage leading from said chopper and an ensilage receiving receptacle, said receptacle having gates at its sides and an endless reversible bottom, driving means propelled by the tractor mechanism and operatively connected with said bottom for moving the same, mechanism controlled by the lowering of said gates to render said driving mechanism operative, and a safety device co-operating with said gates and adapted to prevent the same from being lowered simultaneously.

7. In a device of the class described, an ensilage chopper, a cutter for severing rooted stalks and a throat-like feeder including upper and lower traveling members for taking and directing the stalks in their grasp, tops first, into said chopper prior to the severance thereof by said cutter.

8. In a device of the class described, a chopper, a feeder including co-operating power driven members, said feeder being adapted to take and direct ensilage material into said chopper, tops first, without interruption in its hold on said material, and a cutter for severing the ensilage material subsequently to its engagement by said feeder.

9. In a device of the class described, a cutter for ensilage material, a central and outer conveyors passing rearwardly from said cutter, means for actuating said conveyors, an ensilage chopper at the delivery end of said central conveyor, cross-feed mechanism at the extremities of the outer conveyors to direct ensilage material therefrom to said central conveyor, and means for actuating said cross-feed mechanism.

10. In a device of the class described, a relatively wide cutter for severing ensilage material near the butts of its stalks, a relatively narrow chopper at the rear of the cutter, a feeder for directing the ensilage material into the chopper, top ends foremost, said feeder including upper and lower traveling members converging toward the chopper, means for actuating said traveling members, also opposed traveling members at the sides of the chopper, and means for actuating said latter traveling members.

11. In a device of the class described, a relatively wide cutter for severing ensilage material near the butts of its stalks, a relatively narrow chopper at the rear of the cutter and a feeder for gathering the severed material laterally and simultaneously directing the same into said narrow chopper, top ends foremost.

12. In a device of the class described, the combination with a tractor, of a frame mounted thereon, a cutter for ensilage material, a chopper, a conveyor leading from the cutter toward the chopper, feeding rolls at the mouth of the chopper, a claw interposed between the feeding rolls and the delivery end of the conveyor, all carried by said frame and means propelled by the tractor mechanism for driving said cutter, chopper, conveyor, feeding rolls and claw.

13. In a device of the class described, the combination with a tractor, of a frame mounted thereon, a horizontally disposed chopper, a horizontally disposed cutter, an endless conveyor leading from the latter to the former, a forwardly extending gatherer, all mounted on said frame, said gatherer comprising a vertically tiltable endless apron, the lower run thereof forming in combination with the upper run of the conveyor a gripping throat for feeding ensilage into the chopper, and means for tilting said apron.

14. In a device of the class described, the combination with a tractor, of a frame mounted thereon, a horizontally disposed cutter on said frame, a horizontally disposed chopper above and at the rear of said cutter, an upwardly inclined endless conveyor leading from the cutter to the chopper, a gatherer comprising a vertically tiltable endless apron extending considerably forward of the cutter and together with the upper run of the conveyor forming a feeding throat leading to the chopper, means for propelling the apron at a speed greater than the travelling speed of the tractor, the lower run of said apron being designed to direct the top ends of vegetation into said throat prior to the severance thereof, at its butts, by said cutter, and means for tilting said apron.

15. In a device of the class described, the combination with a tractor of a floating frame pivotally mounted thereon and resting at its free end upon the ground, a cutter for ensilage material, a chopper, a conveyor leading from the former to the latter and a tiltable elevator leading from the chopper, said cutter, chopper, conveyor and elevator being carried upon said tiltable frame, a superstructure on the tractor, an ensilage receptacle thereon for receiving ensilage from the elevator and a yielding support for the upper or free end of the elevator.

16. In a device of the class described, the combination with a tractor of a frame thereon, a cutter and chopper on said frame, an inner conveyor leading from the cutter to the chopper, outer conveyors also leading from the cutter and extending in the general direction of said inner conveyor, means for driving said conveyors, cross feed devices at the heads of said outer conveyors, each cross feed device comprising an endless movable support, arms depending from said support, means for moving the support, said arms being advanced in their lower working sweep toward the inner conveyor.

17. In a device of the class described, the combination with a tractor of a frame thereon, a cutter and chopper on said frame, an inner conveyor leading from the cutter to the chopper, outer conveyors also leading from the cutter and extending in the general direction of said inner conveyor, means for driving said conveyors, cross feed devices at the heads of said outer conveyors, each cross feed device comprising a housing, an endless chain mounted in said housing, means for driving said chain, the lower reach thereof being driven toward the inner conveyor in a slightly upwardly inclined path, arms pivoted on and depending from said chain, said arms in their lower working sweep passing closely adjacent to the head of their corresponding outer conveyor, reaches on said arms, rollers on said reaches and a way in said housing in which said rollers ride.

18. In a device of the class described, the combination with a tractor, of a frame mounted thereon, a chopper, a cutter for ensilage material, a conveyor leading rearwardly from the cutter to the chopper and a forwardly extending tiltable gatherer forming in combination with said conveyor an adjustable gripping throat opening into said chopper, all carried by said frame, and means for tilting said gatherer.

19. In a device of the class described, the combination with a tractor, of a frame mounted thereon, a chopper, a cutter for ensilage material, a conveyor leading rearwardly from the cutter to the chopper and a forwardly extending, extensible and contractible gatherer tiltable vertically and forming in combination with said conveyor a gripping throat opening into said chopper, all carried by said frame, and means for tilting said gatherer.

20. In a device of the class described, the combination with a tractor, of a frame mounted thereon, a chopper, a cutter for ensilage material, a conveyor leading rearwardly from the cutter to the chopper and a forwardly extending and vertically tiltable gatherer forming in combination with said conveyor a gripping throat opening into said chopper, all carried by said frame, and means for tilting said gatherer.

In testimony whereof, I have signed my name to this specification.

ALF M. BOXRUD.